G. SMITH.
Combined Fryer and Broiler.
No. 144,151. Patented Oct. 28, 1873.
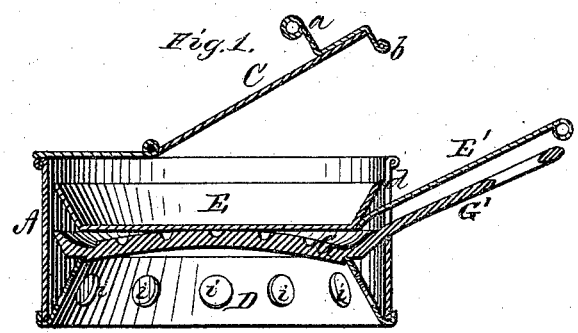
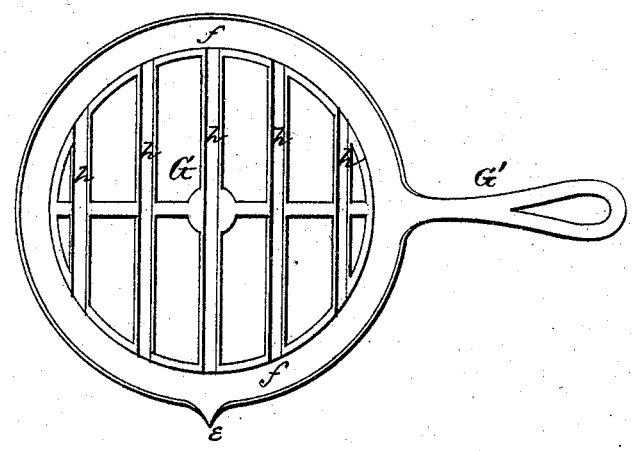
Witnesses
John A. Ellis
Wm. K. Ellis
Inventor
George Smith,
Per,
J. H. Alexander & Co.
Atty's

UNITED STATES PATENT OFFICE.

GEORGE SMITH, OF WILLIAMSBURG, NEW YORK.

IMPROVEMENT IN COMBINED FRIERS AND BROILERS.

Specification forming part of Letters Patent No. 144,151, dated October 28, 1873; application filed March 19, 1873.

*To all whom it may concern:*

Be it known that I, GEORGE SMITH, of Williamsburg, in the county of Kings and State of New York, have invented certain new and useful Improvements in Frier and Broiler; and I do hereby declare that the following is a full, clear, and exact description thereof, reference being had to the accompanying drawings and to the letters of reference marked thereon which form a part of this specification.

The nature of my invention consists in the construction and arrangement of a bottomless vessel with frying-pan and gridiron, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my entire utensil, and Fig. 2 is a plan view of the gridiron.

A represents a round or oval-shaped vessel having no bottom and provided with handles. A part, C, of the top is hinged in such a manner that it can readily be opened and closed at will. To the center of the outer edge of the hinged lid C is attached a thumb-piece, $a$, with a catch, $b$, extending downward and closing a part of a slot, $d$, made in the side of the vessel A. At and around the lower edge of the vessel A is attached a rim, D, which extends a short distance upward within the vessel and is contracted or tapering upward, as shown in Fig. 1. In this rim are a number of holes, $i\ i$, as shown. E represents an ordinary frying-pan, with handle E', which may be used with the vessel A in like manner as the gridiron, but I make no separate claim thereto; and G represents the gridiron with handle G'. The gridiron is simply composed of a circular rim, $f$, with cross-bars $h\ h$. This rim has a groove running all around on the upper side, and the cross-bars are also grooved on their upper sides longitudinally, said grooves in the cross-bars leading or opening into the groove in the rim, so that the juice from the article broiling will be collected and can be poured out through a spout, $e$. The frying-pan or the gridiron being placed on the rim D in the vessel A, with the handle extending through the slot $d$, the lid C is closed, the catch $b$ closing the remainder of said slot.

All the smoke arising from the article frying or broiling will pass around the edges of the pan or gridiron and, through the apertures $i$, into the stove, and out through the chimney.

Having thus fully described my invention, what I claim as new, and desire to secure by Letters Patent, is—

The broiling device herein described, consisting of the vessel A with its hinged lid, perforated rim D, and the broiler G with grooved bars and nozzle, constructed as shown and described, as and for the purpose specified.

In testimony that I claim the foregoing as my own I affix my signatures in presence of two witnesses.

GEORGE SMITH.

Witnesses:
 CHARLES R. HENRY,
 A. H. HENRY.